United States Patent
McClellan

[11] 3,750,321
[45] Aug. 7, 1973

[54] ARTIFICIAL LURE FOR FISHING

[75] Inventor: Bingham A. McClellan, Traverse City, Mich.

[73] Assignee: McClellan Industries, Inc., Traverse City, Mich.

[22] Filed: Apr. 17, 1972

[21] Appl. No.: 244,742

[52] U.S. Cl............... 43/42.1, 43/42.32, 43/42.37, 43/42.39
[51] Int. Cl............................................ A01k 85/00
[58] Field of Search.............. 43/42.1, 42.37, 42.43, 43/43.2, 43.4, 43.6, 42.39

[56] References Cited
UNITED STATES PATENTS

| | | | |
|---|---|---|---|
| 2,817,922 | 12/1957 | Takeshita | 43/41.37 X |
| 3,191,336 | 6/1965 | Cordell, Jr. | 43/42.37 X |
| 2,781,604 | 2/1957 | Brown | 43/42.37 X |
| 887,765 | 5/1908 | Buschemeyer | 43/42.43 X |

Primary Examiner—Robert Peshock
Assistant Examiner—Daniel J. Leach
Attorney—Austin A. Webb

[57] ABSTRACT

A fish hook with a curve and barb at one end of its shank has an angle bend near the other end of the shank in the plane of the curve and with a line attaching eye at its end of the same side of the curve and barb. A sphere-like body of molded vinyl plastic is formed integrally around the bend in the shank and extends to adjacent the eye. An arm of the same material as the body and molded integrally therewith extends radially of the body to a point spaced laterally outwardly and forwardly of the point of the barb. The arm tapers rearwardly and is springable past the point of the barb. A forked end on the arm has branches that longitudinally overlap the point of the barb.

1 Claim, 3 Drawing Figures

PATENTED AUG 7 1973
3,750,321
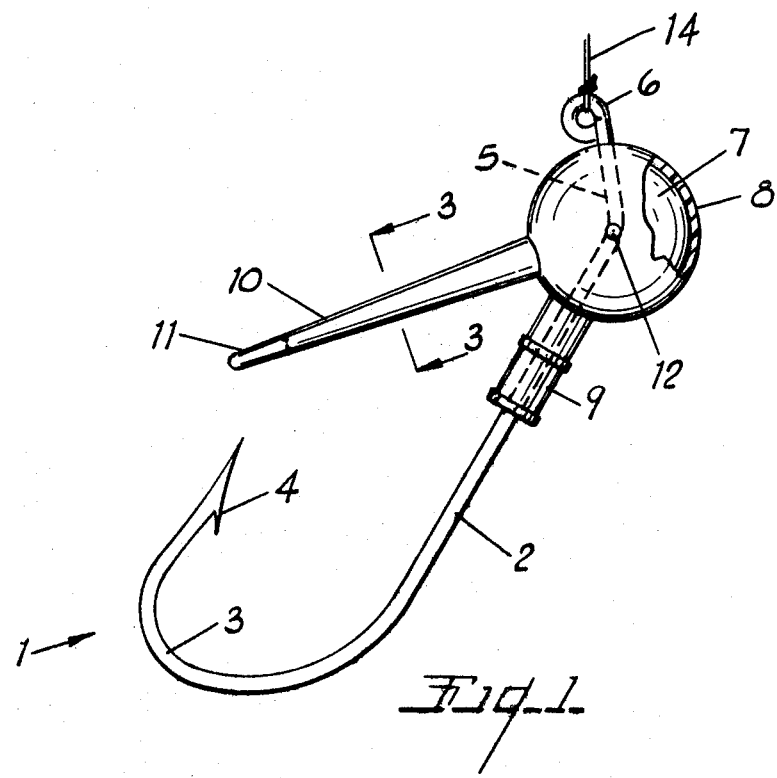
Fig. 1
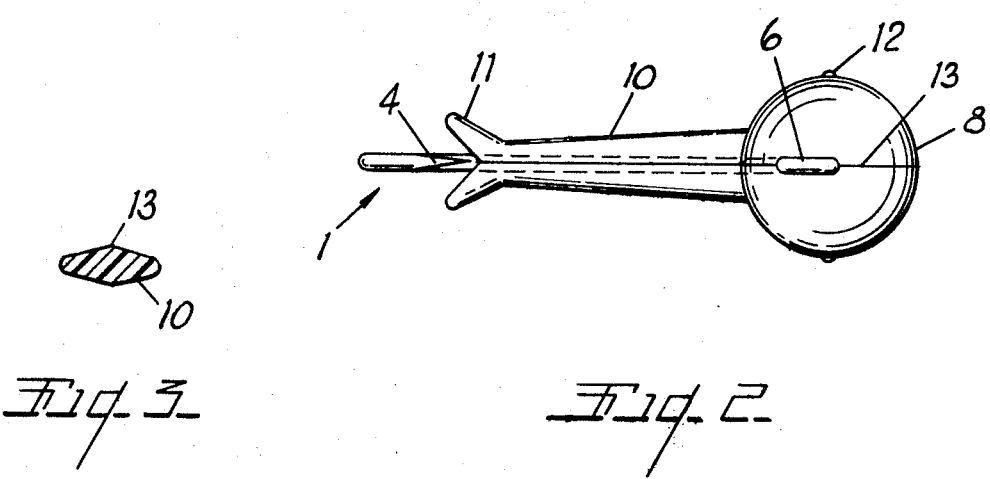
Fig. 3
Fig. 2

ARTIFICIAL LURE FOR FISHING

OUTLINE OF INVENTION AND PRIOR ART

Artificial fishing lures have previously been provided with springable and yieldable fingers that extend from a forward body or hook shank part to adjacent the barb of the hook. The function of these fingers is to deflect and prevent entrance of weeds into the curve of the hook, and thus provide a "weedless" hook. Some of these weed guard fingers have been formed of flexible wire, and others have been rubbery, flexible strands that are initially impaled on the hook barb to hold them in operative position until pulled off by the bite of a fish.

The present invention relates to improvements in a weedless artificial lure which reduce the cost and increase the effectiveness and reliability of the weed guard elements of the lure. It is evident that to be effective a weed guard must continue to bridge the open end of a hook, and that inaccurate placement or accidental displacement of the guard finger from the general plane of the barb end of the hook will render the weed guard properties ineffective. By molding the lure body and an integral weed guard finger on the shank of a hook at the same time, not only are costs of assembly reduced but the accuracy and permanence of location of the guard finger is assured.

It is further evident if the end of a guard finger is too rigidly positioned or connected relative to the barb of a hook, it will undesirably resist deflection by the bite of a fish. On the other hand, if the finger is too flexible or too weakly held in blocking position in front of the barb, the pressure of weeds against the finger will deflect the finger and permit weeds to enter and tangle with the hook. The guard finger of the invention has a graduated flexibility so that weed pressure deflects the lure rather than deflecting the finger relative to the hook, while still leaving the tip of the finger readily deflectable by the bite of a fish. Not only does the structure of the finger provide optimum pressure characteristics, but it coacts with the body in producing improved stability and position of the entire lure in use.

DESCRIPTION

The drawings, of which there is one sheet, illustrate a preferred form of the lure of the invention.

FIG. 1 is a side elevational view of the lure, with a portion of the lure broken away.

FIG. 2 is a top elevational view.

FIG. 3 is a transverse cross sectional view through the guard arm, taken on line 3—3 in FIG. 1.

The hook, generally indicated by the numeral 1 has a straight shank 2 with the usual rear bend 3 leading to the barb 4. The forward end of the shank has an upward bend 5 leading to the usual line attaching eye 6. The entire hook lies in a general upright plane, although the tip of the barb may be offset somewhat laterally. The eye end 6 is approximately aligned with the point of the barb 4.

A generally spherical lead sinker body 7 is molded around the bend 5 and is thus nonrotatably and nondisplaceably connected to the hook. The size and weight of the sinker may vary, but is generally determined from the size of the hook and known fishing practices and skills. A covering 8 of vinyl plastic is molded continuously around the sinker 7 and extends to the base of the eye. An integral short cylindrical neck 9 may be formed on the body to extend its connection to the hook. The radius of the covering 8 is approximately equal to the length of the upper end of the bend 5 below the eye.

Projecting integrally from the lower rear quadrant of the covering 8 is a weed guard arm generally indicated by the numeral 10. At its junction with the covering, the arm has a vertical dimension that is approximately one-third, or somewhat less than, the radius of the combined sinker and covering. In transverse dimension, the arm is slightly smaller than the radius of the combined sinker and covering. The arm tapers rearwardly to about one-half the size of its front end at a point just forwardly of, and above, the barb 4. Here the arm is divided into two divergent tips or wings 11 that straddle the barb, and clear the barb when the arm is deflected vertically as by the bite of a fish.

Two small protrusions 12 on the sides of the covering, or other surface configuration may be provided to simulate the eyes of a water creature.

The body covering 8 and arm 9, as previously stated, are integrally molded of plastic vinyl material. The molding is easily accomplished to properly locate the parts by clamping the hook with the sinker 7 thereon on its side between the halves of a mold, so that a parting plane indicated by the line 13 is formed on the covering and the arm. The total weight of the lure is such that the shank of the hook hangs freely as shown at about 30 degrees behind a suspending line 14.

The flattened shape of the arm 10 functions as a guide and stabilizer for the lure. When the line is jerked upwardly as in jig fishing, the hook tends to tilt downwardly. If the line is trolled or jerked forwardly to the right as shown, the arm causes the hook to remain approximately as shown. In either position, the arm overlies the curve of the hook to prevent weeds from being entangled on the hook.

The tapered shape of the arm 10 provides a spring action which is relatively free or limber at the tips 11, but which becomes stronger towards the covering 8. The arm thus easily yields to the bite of a fish, but resists deflecting motion when encountering a weed. Note that lateral or vertical deflecting pressure applied by a weed near the free end of the arm will not necessarily or actually open the arm. A force which would easily open the arm if applied as a bite by a fish will cause the entire lure to pivot or swing about the center of the body to move past a weed contacting the top or side of the arm. The transverse dimension of the arm is greater than its vertical dimension so that the arm has less tendency to bend laterally.

The vinyl or other plastic material from which the body is formed is cured to a yieldable hardness which gives the body excellent wear and strength characteristics while leaving the arm with the desired flexibility. A harder plastic would have less flexibility, but this could be compensated for by reducing the cross section of the arm. The weight of the lure is determined primarily by the sinker for any given hook. The thickness of the covering can be varied but a thickness of the order of two to three thirty-seconds of an inch provides an adequate junction area and connection between the covering and the arm, and also provides a proper bulk to weight ratio in the over all body. The weight of the lure may be decreased by reducing the size or the transverse dimension of the sinker, thus producing a somewhat flattened body.

What is claimed as new is:

1. A weedless jig-type fishing lure comprising
a hook having a shank with a return curve and barb at one end and an angled bend in the plane of said curve and a line attaching eye at its front end,
a generally spherical sinker weight immovably secured around said shank in surrounding relation to said angled bend and adjacent to said eye,
an integral body of vinyl plastic molded in self retaining engagement around said weight and the front of the shank and terminating short of said eye,
and said body having a rearwardly extending arm projecting integrally therefrom between said eye and said said shank in the plane of said return curve in diverging relation at about 30° from the shank of said hook into closely and forwardly spaced relation to the barb on said hook,
said arm tapering in rearwardly decreasing cross section from the surface of said body and having a major cross sectional dimension about one-third the diameter of the body at the surface of the body disposed transversely to the plane of the curve of said hook.

* * * * *